United States Patent
Kazuno et al.

(10) Patent No.: US 8,303,372 B2
(45) Date of Patent: Nov. 6, 2012

(54) POLISHING PAD

(75) Inventors: Atsushi Kazuno, Osaka (JP); Tetsuo Shimomura, Osaka (JP); Yoshiyuki Nakai, Osaka (JP); Kazuyuki Ogawa, Osaka (JP); Tsuyoshi Kimura, Osaka (JP)

(73) Assignee: Toyo Tire & Rubber Co., Ltd., Osaka-shi (JP)

( * ) Notice: Subject to any disclaimer, the term of this patent is extended or adjusted under 35 U.S.C. 154(b) by 746 days.

(21) Appl. No.: 12/439,135

(22) PCT Filed: Aug. 22, 2007

(86) PCT No.: PCT/JP2007/066288
§ 371 (c)(1), (2), (4) Date: Feb. 26, 2009

(87) PCT Pub. No.: WO2008/026488
PCT Pub. Date: Mar. 6, 2008

(65) Prior Publication Data
US 2010/0015893 A1 Jan. 21, 2010

(30) Foreign Application Priority Data
Aug. 31, 2006 (JP) ................ 2006-235978

(51) Int. Cl.
*B24B 1/00* (2006.01)

(52) U.S. Cl. .................... 451/41; 451/526

(58) Field of Classification Search .......... 451/28, 451/41, 56, 526; 521/159, 170
See application file for complete search history.

(56) References Cited

U.S. PATENT DOCUMENTS

| | | |
|---|---|---|
| 3,198,757 A | 8/1965 | Considine et al. |
| 4,410,668 A | 10/1983 | Piccirilli et al. |
| 5,455,113 A | 10/1995 | Girgis et al. |
| 5,587,502 A | 12/1996 | Moren et al. |
| 5,614,575 A | 3/1997 | Kotschwar |
| 5,670,599 A | 9/1997 | Bassner |
| 5,840,782 A | 11/1998 | Limerkens et al. |
| 6,439,989 B1 | 8/2002 | Reinhardt et al. |
| 6,477,926 B1 | 11/2002 | Swisher et al. |
| 6,706,383 B1 | 3/2004 | Obeng et al. |

(Continued)

FOREIGN PATENT DOCUMENTS

CN 1407606 4/2003

(Continued)

OTHER PUBLICATIONS

Chinese Office Action mailed Apr. 1, 2010, directed to counterpart Chinese Application No. 200780027348.8; 9 pages.

(Continued)

Primary Examiner — Dung Van Nguyen
(74) Attorney, Agent, or Firm — Morrison & Foerster LLP

(57) ABSTRACT

A polishing pad having excellent planarization performance and wear resistance includes a polishing layer including a polyurethane foam having fine cells. The polyurethane foam is a cured product of a reaction of (1) an isocyanate-terminated prepolymer (A) that is capable of reacting with 4,4'-methylenebis(o-chloroaniline) to form a non-foamed polyurethane having a tan δ peak temperature of 100° C. or more, (2) an isocyanate-terminated prepolymer (B) that is capable of reacting with 4,4'-methylenebis(o-chloroaniline) to form a non-foamed polyurethane having a tan δ peak temperature of 40° C. or less, and (3) 4,4'-methylenebis(o-chloroaniline), and the isocyanate-terminated prepolymers (A) and (B) are mixed in an (A)/(B) ratio of 50/50 to 90/10 (by wt%). The pad so made is used in the manufacture of semiconductor devices.

5 Claims, 1 Drawing Sheet

U.S. PATENT DOCUMENTS

| | | | |
|---|---|---|---|
| 6,777,455 | B2 | 8/2004 | Seyanagi et al. |
| 6,837,781 | B2 | 1/2005 | Hishiki |
| 6,887,911 | B2 | 5/2005 | Shidaker et al. |
| 7,094,811 | B2 | 8/2006 | Nodelman et al. |
| 2002/0016139 | A1 | 2/2002 | Hirokawa et al. |
| 2002/0058469 | A1 | 5/2002 | Pinheiro et al. |
| 2002/0078632 | A1 | 6/2002 | Hasegawa et al. |
| 2002/0183409 | A1 | 12/2002 | Seyanagi et al. |
| 2003/0109209 | A1 | 6/2003 | Hishiki |
| 2003/0143931 | A1 | 7/2003 | Hirokawa et al. |
| 2004/0054023 | A1 | 3/2004 | Kaneda et al. |
| 2004/0157985 | A1 | 8/2004 | Masui et al. |
| 2004/0224622 | A1 | 11/2004 | Sakurai et al. |
| 2004/0242719 | A1 | 12/2004 | Seyanagi et al. |
| 2005/0064709 | A1 | 3/2005 | Shimomura et al. |
| 2005/0171224 | A1 | 8/2005 | Kulp |
| 2005/0176912 | A1 | 8/2005 | Shin et al. |
| 2005/0222288 | A1 | 10/2005 | Seyanagi et al. |
| 2006/0037699 | A1 | 2/2006 | Nakamori et al. |
| 2006/0078742 | A1 | 4/2006 | Kauffman et al. |
| 2006/0089095 | A1 | 4/2006 | Swisher et al. |
| 2006/0122287 | A1 | 6/2006 | Yamamoto et al. |
| 2006/0280929 | A1 | 12/2006 | Shimomura et al. |
| 2006/0280930 | A1 | 12/2006 | Shimomura et al. |
| 2007/0190905 | A1 | 8/2007 | Shimomura et al. |
| 2008/0085943 | A1 | 4/2008 | Doura et al. |
| 2008/0305720 | A1 | 12/2008 | Hirose et al. |
| 2008/0313967 | A1 | 12/2008 | Sakurai et al. |
| 2009/0047872 | A1 | 2/2009 | Fukuda et al. |
| 2009/0093201 | A1 | 4/2009 | Kazuno et al. |
| 2009/0104850 | A1 | 4/2009 | Ogawa et al. |
| 2009/0253353 | A1 | 10/2009 | Ogawa et al. |
| 2009/0298392 | A1 | 12/2009 | Okamoto et al. |
| 2010/0003896 | A1 | 1/2010 | Nakai et al. |
| 2010/0048102 | A1 | 2/2010 | Nakai et al. |
| 2011/0218263 | A1 | 9/2011 | Kazuno et al. |

FOREIGN PATENT DOCUMENTS

| | | |
|---|---|---|
| CN | 1487965 | 4/2004 |
| CN | 1586002 | 2/2005 |
| CN | 1602321 | 3/2005 |
| CN | 1628138 | 6/2005 |
| CN | 101115779 | 1/2008 |
| EP | 0 656 031 | 6/1995 |
| EP | 1 647 588 A2 | 4/2006 |
| JP | 2-91279 | 3/1990 |
| JP | 2003-224094 A | 8/1993 |
| JP | 6-220151 | 8/1994 |
| JP | 8-500622 | 1/1996 |
| JP | 3013105 | 1/1996 |
| JP | 8-71378 | 3/1996 |
| JP | 11-511748 | 10/1999 |
| JP | 2000-17252 | 1/2000 |
| JP | 3516874 | 6/2000 |
| JP | 2000-248034 | 9/2000 |
| JP | 2000-343412 | 12/2000 |
| JP | 2001-047355 A | 2/2001 |
| JP | 2001-89548 | 4/2001 |
| JP | 2001-105300 | 4/2001 |
| JP | 2001-513450 | 9/2001 |
| JP | 2001-277101 | 10/2001 |
| JP | 2001-518852 | 10/2001 |
| JP | 2002-59358 | 2/2002 |
| JP | 2002-134445 | 5/2002 |
| JP | 2002-144220 | 5/2002 |
| JP | 2002-239905 | 8/2002 |
| JP | 3455187 | 8/2002 |
| JP | 2002-535843 | 10/2002 |
| JP | 3359629 | 12/2002 |
| JP | 2003-11066 | 1/2003 |
| JP | 2003-62748 | 3/2003 |
| JP | 2003-89051 | 3/2003 |
| JP | 2003-128910 | 5/2003 |
| JP | 2003-145414 | 5/2003 |
| JP | 2003-171433 | 6/2003 |
| JP | 2003-218074 | 7/2003 |
| JP | 2004-1169 A | 1/2004 |
| JP | 3490431 | 1/2004 |
| JP | 2004-75700 | 3/2004 |
| JP | 2004-167680 | 6/2004 |
| JP | 2004-188716 | 7/2004 |
| JP | 2004-193390 | 7/2004 |
| JP | 2004-211076 | 7/2004 |
| JP | 3571334 | 7/2004 |
| JP | 2004-235446 A | 8/2004 |
| JP | 2004-330411 | 11/2004 |
| JP | 2005-52907 | 3/2005 |
| JP | 2005-68174 | 3/2005 |
| JP | 2005-068175 A | 3/2005 |
| JP | 2005-120275 | 5/2005 |
| JP | 2005-517060 | 6/2005 |
| JP | 2006-111880 A | 4/2006 |
| JP | 2006-190826 | 7/2006 |
| JP | 2006-231429 A | 9/2006 |
| WO | WO-94/04599 | 3/1994 |
| WO | WO-96/38453 | 12/1996 |
| WO | WO-98/45087 | 10/1998 |
| WO | WO-99/07515 | 2/1999 |
| WO | WO-00/43159 | 7/2000 |
| WO | WO-01/96434 | 12/2001 |
| WO | WO-02/24415 | 3/2002 |
| WO | WO-02/083757 | 10/2002 |
| WO | WO-03/043071 | 5/2003 |
| WO | WO-03/043071 A1 | 5/2003 |
| WO | WO-03/066703 | 8/2003 |
| WO | WO-2004/049417 | 6/2004 |
| WO | WO-2004/055089 | 7/2004 |
| WO | WO-2006/095591 | 9/2006 |

OTHER PUBLICATIONS

International Search Report, mailed Nov. 27, 2007, directed to counterpart International Patent Application No. PCT/JP2007/066288; 4 pages (w/trans).

Doura et al., U.S. Office Action mailed Jul. 22, 2010, directed to U.S. Appl. No. 11/794,284; 7 pages.

Doura et al., U.S. Office Action mailed Jan. 6, 2011, directed to U.S. Appl. No. 11/794,284; 5 pages.

Doura et al., U.S. Office Action mailed Jul. 8, 2011, directed to U.S. Appl. No. 11/794,284; 6 pages.

Kazuno et al., U.S. Office Action mailed Dec. 6, 2010, directed to U.S. Appl. No. 11/914,547; 15 pages.

Kazuno et al., U.S. Office Action mailed Jun. 23, 2011, directed to U.S. Appl. No. 11/914,547; 12 pages.

Kazuno et al., U.S. Office Action mailed Nov. 28, 2011, directed to U.S. Appl. No. 11/914,547; 8 pages.

Kazuno et al., U.S. Office Action mailed Nov. 10, 2011, directed to U.S. Appl. No. 13/107,347; 7 pages.

Ogawa et al., U.S. Office Action mailed Dec. 21, 2010, directed to U.S. Appl. No. 12/065,219, 10 pages.

Ogawa et al., U.S. Office Action mailed May 11, 2011, directed to U.S. Appl. No. 12/065,219; 11 pages.

Fukuda et al., U.S. Office Action mailed Jun. 8, 2011, directed to U.S. Appl. No. 12/095,859; 7 pages.

Nakai, Y. et al., U.S. Office Action mailed Nov. 10, 2011, directed to U.S. Appl. No. 12/439,154; 17 pages.

Nakai, Y. et al., U.S. Office Action mailed Nov. 25, 2011, directed to U.S. Appl. No. 12/593,206; 8 pages.

Chinese Decision of Rejection mailed Nov. 12, 2010, directed to Chinese Patent Application No. 200780027350.5; 26 pages.

Chinese Office Action mailed Aug. 4, 2010, directed to Chinese Patent Application No. 200880008905.6; 7 pages.

Chinese Notification of the Second Office Action issued on Jun. 17, 2011, directed to Chinese Patent Application No. 200880008905.6; 10 pages.

Chinese Office Action issued Apr. 22, 2010, directed to Chinese Application No. 200910135487.3; 17 pages.

Chinese Office Action issued Jan. 8, 2010, directed to Chinese Application No. 200680004397.5; 25 pages.

Chinese Office Action issued Jul. 10, 2009, directed to Application No. 200680017384.1; 6 pages.

Chinese Office Action issued Mar. 23, 2010, directed to Chinese Application No. 200910135488.8; 13 pages.

Chinese Office Action issued Nov. 21, 2008, directed to Chinese Application No. 200680017384.1; 9 pages.
Chinese Office Action mailed Mar. 11, 2010, directed to Chinese Patent Application No. 200780027350.5; 17 pages.
Chinese Office Action mailed May 8, 2009, directed to Chinese Application No. 2006800321010; 5 pages.
Chinese Rejection Decision mailed Jul. 29, 2011, directed to Chinese Application No. 200910135487.3; 14 pages.
Chinese Second Office Action issued Apr. 13, 2011, directed to Chinese Application No. 200910135487.3; 16 pages.
Chinese Second Office Action issued May 5, 2011, directed to Chinese Application No. 200680004397.5; 21 pages.
Chinese Second Office Action mailed Nov. 23, 2010, directed to Chinese Application No. 200910135488.8; 14 pages.
Chinese Third Office Action mailed Aug. 29, 2011, directed to Chinese Patent Application No. 200680004397.5; 16 pages.
Decision of Refusal mailed Jun. 24, 2011, directed to Japanese Application No. 2005-144304; 4 pages.
Decision of Refusal mailed Jun. 28, 2011, directed to Japanese Application No. 2005-144292; 4 pages.
Decision of Refusal mailed Jun. 28, 2011, directed to Japanese Application No. 2005-144318; 4 pages.
International Preliminary Report on Patentability and Written Opinion mailed Jul. 24, 2008, directed to Application No. PCT/JP2007/050072; 11 pages.
International Preliminary Report on Patentability, mailed Mar. 13, 2008, directed to Application No. PCT/JP2006/316372; 6 pages.
International Search Report mailed Aug. 8, 2006 directed to Application No. PCT/JP2006/309380; 11 pages.
International Search Report mailed Jun. 24, 2008, directed to International Patent Application No. PCT/JP2008/054583; 2 pages.
International Search Report mailed Mar. 6, 2007, directed to Application No. PCT/JP2007/050072; 3 pages.
International Search Report mailed May 30, 2006, directed to Application No. PCT/JP2006/303605; 4 pages.
International Search Report mailed Nov. 21, 2006, directed to Application No. PCT/JP2006/316372; 4 pages.
International Search Report mailed Nov. 27, 2007, directed to International Patent Application No. PCT/JP2007/065934; 1 page.
Japanese Notification of Reasons for Refusal mailed Aug. 17, 2011, directed to U.S. Application No. 2006-006210; 5 pages.
Japanese Notification of Reasons for Refusal mailed Aug. 9, 2011, directed to U.S. Application No. 2005-249046; 6 pages.
Japanese Notification of Reasons for Refusal mailed Jul. 12, 2011, directed to Japanese Application No. 2006-002346; 6 pages.
Japanese Notification of Reasons for Refusal mailed Mar. 15, 2011, directed to Japanese Application No. 2005-144292; 6 pages.
Japanese Notification of Reasons for Refusal mailed Mar. 15, 2011, directed to Japanese Application No. 2005-144304; 6 pages.
Japanese Notification of Reasons for Refusal mailed Mar. 15, 2011, directed to Japanese Application No. 2005-144318; 6 pages.
Japanese Notification of Reasons for Refusal mailed May 27, 2011, directed to Japanese Application No. 2006-005787; 6 pages.
Japanese Notification of Reasons for Refusal mailed Nov. 25, 2010, directed to Japanese Application No. 2006-002346; 4 pages.
Japanese Notification of Reasons for Refusal mailed Nov. 25, 2010, directed to Japanese Application No. 2006-005803; 4 pages.
Japanese Notification of Reasons for Refusal mailed Oct. 4, 2011, directed to Japanese Patent Application No. 2006/235978; 13 pages.
Korean Office Action mailed Jul. 7, 2011, directed to Korean Application No. 10-2009-7013449; 5 pages.
Korean Office Action mailed Jul. 7, 2011, directed to Korean Application No. 10-2009-7013450; 6 pages.
Matsunaga, Katsuharu. (2005). "Hard Foam" Section 7.4.3. In *The Comprehensive Materials and Technology for a Novel Polyurethan Production*. First Print, Kabushiki Kaisha CMC Shuppan, pp. 107-108.
Taiwanese Office Action mailed May 18, 2011, directed to Taiwanese Patent Application No. 096130712; 10 pages.
Taiwanese Office Action mailed Nov. 17, 2010, directed to Taiwanese Application No. 096100913; 7 pages.
Notification of First Office Action issued Feb. 28, 2012, directed to Chinese Application No. 201110049840.3; 11 pages.
Notification of the Third Office Action issued Feb. 29, 2012, directed to Chinese Application No. 200880008905.6; 12 pages.
Notice of Hearing mailed Nov. 29, 2011, directed towards Japanese Application No. 2005-144304; 6 pages.
Japanese Notification of Reasons for Refusal mailed Dec. 22, 2011, directed to Japanese Application No. 2006-005787; 4 pages.
Japanese Notification of Reasons for Refusal mailed Feb. 1, 2012, directed to Japanese Application No. 2007-084785; 8 pages.
Taiwanese Office Action mailed Nov. 24, 2011, directed to counterpart Taiwanese Application No. 097109615; 10 pages.
Japanese Notification of Reasons for Refusal mailed Feb. 14, 2012, directed to Japanese Application No. 2006-002346; 4 pages.
Ogawa et al., U.S. Office Action mailed Mar. 21, 2012, directed to U.S. Appl. No. 12/065,219; 7 pages.
Kazuno et al., Office Action mailed Jun. 5, 2012, directed to U.S. Appl. No. 13/107,347; 8 pages.
Nakai et al., Office Action mailed Jun. 7, 2012, directed to U.S. Appl. No. 12/439,154; 17 pages.
Notification of Reexamination issued Apr. 19, 2012, directed to Chinese Application No. 200780027350.5; 15 pages.
Nakai et al., Office Action mailed Jul. 5, 2012, directed to U.S. Appl. No. 12/593,206; 9 pages.

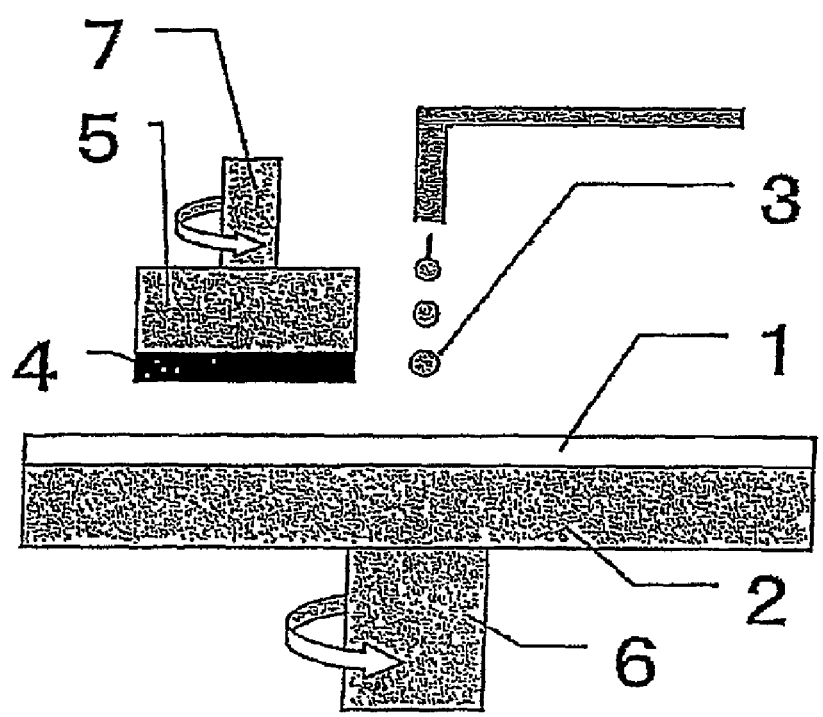

POLISHING PAD

REFERENCE TO RELATED APPLICATIONS

This application is a national stage application under 35 USC 371 of International Application No. PCT/JP2007/066288, filed Aug. 22, 2007, which claims the priority of Japanese Patent Application No. 2006-235978, filed Aug. 31, 2006, the contents of which prior applications are incorporated herein by reference.

FIELD OF THE INVENTION

The invention relates to a polishing pad capable of performing planarization of materials requiring a high surface planarity such as optical materials including a lens and a reflecting mirror, a silicon wafer, a glass substrate or an aluminum substrates for a hard disc and a product of general metal polishing with stability and a high polishing efficiency. A polishing pad of the invention is preferably employed, especially, in a planarization step of a silicon wafer or a device on which an oxide layer or a metal layer has been formed prior to further stacking an oxide layer or a metal layer thereon.

BACKGROUND OF THE INVENTION

Typical materials requiring surface flatness at high level include a single-crystal silicon disk called a silicon wafer for producing semiconductor integrated circuits (IC, LSI). The surface of the silicon wafer should be flattened highly accurately in a process of producing IC. LSI etc., in order to provide reliable semiconductor connections for various coatings used in manufacturing the circuits. In the step of polishing finish, a polishing pad is generally stuck on a rotatable supporting disk called a platen, while a workpiece such as a semiconductor wafer is stuck on a polishing head. By movement of the two, a relative speed is generated between the platen and the polishing head while polishing slurry having abrasive grains is continuously supplied to the polishing pad, to effect polishing processing.

As polishing characteristics of a polishing pad, it is requested that a polished object is excellent in planarity and within wafer non-uniformity and a polishing rate is large. A planarity and within wafer non-uniformity of a polished object can be improved to some extent with a polishing layer higher in elastic modulus.

Considering the development of next-generation devices, there is a demand for high-harness polishing pads capable of further improving flatness. In order to improve flatness, non-foamed hard polishing pads may also be used. When such hard pads are used, however, a problem can occur in which material surfaces are scratched when polished. Also in view of polishing rate, non-foamed polishing pads are not preferred, because their surfaces cannot hold a sufficient amount of abrasive grains from a slurry during polishing. As the hardness of polishing pads increases, their wear resistance tends to decrease. Therefore, high-hardness polishing pads may have a problem with respect to a demand for life elongation.

Also proposed is a polishing pad including a water-insoluble thermoplastic polymer and a water-soluble material dispersed therein (see Patent Literature 1). Although this polishing pad is a non-foamed product, the water-soluble material dispersed in the polishing pad dissolves during polishing so that pores like a foam are formed in the surface of the polishing pad, and that the polishing pad is allowed to swell and thus has reduced surface hardness, which is effective in reducing scratches and improving the polishing rate. However, since the surface of this polishing pad is allowed to swell and thus has reduced hardness, its planarization performance is insufficient.

In order to achieve both an improvement in planarity and a reduction in scratches, a polishing pad is disclosed which include a polymer of an isocyanate-terminated prepolymer produced by a reaction of an organic polyisocyanate, a high molecular weight polyol containing a water-soluble polymeric polyol, and a low molecular weight polyol, and a chain extender (see Patent Literature 2). However, since the surface of this polishing pad is also allowed to swell and thus has reduced hardness, it cannot offer satisfactory planarization performance that will be required in the future.

Patent Literature 1: Japanese Patent Application Laid-Open (JP-A) No. 2001-47355

Patent Literature 2: Japanese Patent No. 3571334

SUMMARY OF THE INVENTION

An object of the invention is to provide a polishing pad having excellent planarization performance and wear resistance and to provide a method for manufacture thereof. Another object of the invention is to provide a method for manufacturing a semiconductor device using such a polishing pad.

As a result of investigations to solve the above problems, the inventors have found that the objects can be achieved with the polishing pad described below, and have completed the invention.

Specifically, the invention is directed to a polishing pad including a polishing layer including a polyurethane foam having fine cells, wherein the polyurethane foam is a cured product of a reaction of (1) an isocyanate-terminated prepolymer (A) that is capable of reacting with 4,4'-methylenebis(o-chloroaniline) to form a non-foamed polyurethane having a tan δ peak temperature of 100° C. or more, (2) an isocyanate-terminated prepolymer (B) that is capable of reacting with 4,4'-methylenebis(o-chloroaniline) to form a non-foamed polyurethane having a tan δ peak temperature of 40° C. or less, and (3) 4,4'-methylenebis(o-chloroaniline), and the isocyanate-terminated prepolymers (A) and (B) are mixed in an (A)/(B) ratio of 50/50 to 90/10 (by wt %).

The inventors have found that the use of a mixture of the two types of isocyanate-terminated prepolymers in the specific ratio allows improvements in both planarization performance and wear resistance.

When the isocyanate-terminated prepolymer (A) or (B) is used alone or when the isocyanate-terminated prepolymer or prepolymers that will form a non-foamed polyurethane with a tan δ peak temperature outside the range are used alone or in combination, either planarization performance or wear resistance will be reduced, and both characteristics cannot be improved at the same time.

If the ratio of the isocyanate-terminated prepolymer (A) in the mixture is less than 50% by weight, the storage elastic modulus of the polyurethane will be relatively small so that the planarization performance of the polishing pad cannot be improved. On the other hand, if the ratio of the isocyanate-terminated prepolymer (A) in the mixture is more than 90% by weight, the wear resistance will be reduced.

The isocyanate-terminated prepolymer (A) preferably includes a unit derived from a high molecular weight polyol with a number average molecular weight of 500 to 800 as a raw material component, and the isocyanate-terminated prepolymer (B) preferably includes a unit derived from a high molecular weight polyol with a number average molecular weight of 1,500 to 3,000 as a raw material component.

The isocyanate-terminated prepolymer (A) also preferably includes isocyanate component units derived from an aromatic diisocyanate and an alicyclic diisocyanate as raw materials, and the isocyanate-terminated prepolymer (B) preferably includes an isocyanate component unit derived from an aromatic diisocyanate as a raw material. When the high molecular weight polyol or isocyanate component is used, the tan δ peak temperature of the non-foamed polyurethane can be easily controlled to be in the above range.

The isocyanate-terminated prepolymer (A) preferably has an NCO content of 9.8 to 15% by weight, and the isocyanate-terminated prepolymer (B) preferably has an NCO content of 1.5 to 7% by weight. When the NCO contents (wt %) of the prepolymers (A) and (B) are each adjusted in the above range, the tan δ peak temperature of the non-foamed polyurethane can be easily controlled to be in the above range.

The invention is also directed to a method for manufacturing a polishing pad including the step (1) of mixing first components with a second component and curing the mixture to form a polyurethane foam, the first components including isocyanate-terminated prepolymers, the second component including a chain extender, the step (1) including adding a nonionic silicone surfactant to the first components including the isocyanate-terminated prepolymers so that the polyurethane foam will contain 0.05 to 10% by weight of the nonionic silicone surfactant, stirring the first components together with a non-reactive gas to form a cell dispersion liquid in which the non-reactive gas is dispersed in the form of fine cells, then mixing the second component including the chain extender into the cell dispersion liquid, and curing the mixture to form the polyurethane foam, the isocyanate-terminated prepolymers including: an isocyanate-terminated prepolymer (A) that is capable of reacting with the chain extender to form a polyurethane having a tan δ peak temperature of 100° C. or more; and an isocyanate-terminated prepolymer (B) that is capable of reacting with the chain extender to form a polyurethane having a tan δ peak temperature of 40° C. or less, the isocyanate-terminated prepolymers (A) and (B) being mixed in an (A)/(B) ratio of 50/50 to 90/10 (by wt %).

The invention is also related to a method for manufacturing a semiconductor device, including the step of polishing a surface of a semiconductor wafer using the polishing pad.

BRIEF DESCRIPTION OF THE DRAWINGS

FIG. 1 is a schematic diagram showing a typical polishing apparatus for use in CMP polishing.

DETAILED DESCRIPTION OF THE INVENTION

The polishing pad of the invention includes a polishing layer including a polyurethane foam having fine cells. The polishing pad of the invention may be only the polishing layer or a laminated body of the polishing layer and any other layer (such as a cushion layer).

Polyurethane is a preferred material for forming the polishing layer, because polyurethane is excellent in abrasion resistance and polymers with desired physical properties can be easily obtained by varying the raw material composition.

The polyurethane resin includes a cured product of a reaction of: (1) an isocyanate-terminated prepolymer (A) that is capable of reacting with 4,4'-methylenebis(o-chloroaniline) to form a non-foamed polyurethane having a tan δ peak temperature of 100° C. or more; (2) an isocyanate-terminated prepolymer (B) that is capable of reacting with 4,4'-methylenebis(o-chloroaniline) to form a non-foamed polyurethane having a tan δ peak temperature of 40° C. or less; and (3) 4,4'-methylenebis(o-chloroaniline).

The isocyanate-terminated prepolymers (A) and (B) may be each prepared using an isocyanate component and a polyol component (such as a high molecular weight polyol and a low molecular weight polyol).

As the isocyanate component, a compound known in the field of polyurethane can be used without particular limitation. The isocyanate component includes, for example, aromatic diisocyanates such as 2,4-toluene diisocyanate, 2,6-toluene diisocyanate, 2,2'-diphenyl methane diisocyanate, 2,4'-diphenyl methane diisocyanate, 4,41-diphenyl methane diisocyanate, 1,5-naphthalene diisocyanate, p-phenylene diisocyanate, m-phenylene diisocyanate, p-xylylene diisocyanate and m-xylylene diisocyanate, aliphatic diisocyanates such as ethylene diisocyanate, 2,2,4-trimethyl hexamethylene diisocyanate and 1,6-hexamethylene diisocyanate, and cycloaliphatic diisocyanates such as 1,4-cyclohexane diisocyanate, 4,4'-dicyclohexyl methane diisocyanate, isophorone diisocyanate and norbornane diisocyanate. These may be used alone or as a mixture of two or more thereof.

As the isocyanate component, it is possible to use not only the above-described diisocyanate compounds but also multifunctional (trifunctional or more) polyisocyanates. As the multifunctional isocyanate compounds, a series of diisocyanate adduct compounds are commercially available as Desmodul-N (Bayer) and Duranate™ (Asahi Chemical Industry Co., Ltd.).

When the isocyanate-terminated prepolymer (A) is prepared, an aromatic diisocyanate is preferably used in combination with an alicyclic diisocyanate, and specifically, toluene diisocyanate is preferably used in combination with dicyclohexylmethane diisocyanate.

When the isocyanate-terminated prepolymer (B) is prepared, an aromatic diisocyanate is preferably used, and, specifically, toluene diisocyanate is preferably used.

As the high molecular weight polyol, those usually used in the art of polyurethane can be exemplified. Examples thereof include polyether polyols represented by polytetramethylene ether glycol and polyethylene glycol; polyester polyols represented by polybutylene adipate; polyester polycarbonate polyols exemplified by reaction products of polyester glycol such as polycaprolactone polyol or polycaprolactone and alkylene carbonate; polyester polycarbonate polyols obtained by reacting ethylene carbonate with polyvalent alcohol and the reacting the resultant reaction mixture with an organic dicarboxylic acid; and polycarbonate polyols obtained by ester exchange reaction between polyhydroxyl compound and aryl carbonate. These may be used singly or in combination of two or more kinds.

When the isocyanate-terminated prepolymer (A) is prepared, a high molecular weight polyol with a number average molecular weight of 500 to 800 is preferably used, and a high molecular weight polyol with a number average molecular weight of 550 to 750 is more preferably used.

When the isocyanate-terminated prepolymer (B) is prepared, a high molecular weight polyol with a number average molecular weight of 1,500 to 3,000 is preferably used, and a high molecular weight polyol with a number average molecular weight of 1,700 to 2,500 is more preferably used.

Examples of the low molecular weight polyol include ethylene glycol, 1,2-propylene glycol, 1,3-propylene glycol, 1,2-butanediol, 1,3-butanediol, 1,4-butanediol, 2,3-butanediol, 1,6-hexanediol, neopentyl glycol, 1,4-cyclohexanedimethanol, 3-methyl-1,5-pentanediol, diethylene glycol, triethylene glycol, 1,4-bis(2-hydroxyethoxy)benzene, trimethylolpropane, glycerin, 1,2,6-hexanetriol, pentaerythritol, tetramethylolcyclohexane, methylglucoside, sorbitol, mannitol, dulcitol, sucrose, 2,2,6,6-tetrakis(hydroxymethyl)cyclohexanol, diethanolamine, N-methyldiethanolamine, and triethanolamine. One or more of these polyols may be used alone or in any combination.

A low molecular weight polyamine such as ethylenediamine, tolylenediamine, diphenylmethanediamine, or diethylenetriamine may also be used as a raw material for the isocyanate-terminated prepolymer (A) and (B) concomitantly. An alcoholamine such as monoethanolamine, 2-(2-aminoethylamino)ethanol, or monopropanolamine may also be used concomitantly. These materials may be used alone or one or more of these may be used concomitantly.

In order to adjust the tan δ peak temperature in the desired range, the amount of addition of the low molecular weight polyol or the low molecular weight polyamine or the like is preferably, but not limited to, from 5 to 55% by mole, more preferably from 5 to 40% by mole, based on the amount of all the active hydrogen group-containing compounds used as raw materials for the isocyanate-terminated prepolymer (A) and (B).

When the isocyanate-terminated prepolymer (A) is prepared, the raw materials are preferably blended in such a manner that the NCO content falls within the range of 9.8 to 15% by weight, more preferably within the range of 11 to 14.5% by weight. When the isocyanate-terminated prepolymer (B) is prepared, the raw materials are preferably blended in such a manner that the NCO content falls within the range of 1.5 to 7% by weight, more preferably within the range of 2 to 6.5% by weight.

When the polyurethane foam is produced by a prepolymer method, 4,4'-methylenebis(o-chloroaniline) (MOCA) is used as a chain extender to cure the prepolymers (A) and (B). The use of MOCA provides high reactivity and allows the production of a polyurethane foam with excellent physical properties.

In an embodiment of the invention, the isocyanate-terminated prepolymers (A) and (B) are mixed essentially in an (A)/(B) ratio of 50/50 to 90/10 (by wt %), preferably in an (A)/(B) ratio of 55/45 to 85/15 (by wt %). In order to produce a polishing pad having desired polishing characteristics, the number of the isocyanate groups of the isocyanate components is preferably from 0.8 to 1.2, more preferably from 0.99 to 1.15, per the number of the amino groups of MOCA. If the number of the isocyanate groups is outside the range, insufficient curing could occur so that the required specific gravity or the required hardness could not be achieved, which tends to decrease the polishing characteristics.

The non-foamed polyurethane produced by the reaction of the isocyanate-terminated prepolymers (A) and (B) with MOCA preferably has a storage elastic modulus (E') of 800 to 2,500 MPa, more preferably of 900 to 2,000 MPa at 40° C. If the storage elastic modulus is less than 800 MPa, the planarization performance may tend to be low. If it is more than 2,500 MPa, wafer surfaces may tend to be scratched. The tan δ at 40° C. is preferably from 0.07 to 0.3, more preferably from 0.1 to 0.2. If the tan δ is less than 0.07, the wear resistance may tend to be reduced. If the tan δ is more than 0.3, the dressing performance could be reduced so that the polishing rate may tend to be low. The physical properties of the polyurethane resin, such as the storage elastic modulus and the tan δ, should be evaluated at a temperature of 40° C., because the temperature of polishing pad surfaces generally rises to about 40° C. during polishing.

The polyurethane foam is preferably produced by melting method in view of cost, working environment and so on, while it may be produced by application of any known urethane foaming techniques such as melting method and solution technique.

According to the invention, the polyurethane foam production is performed using a prepolymer process. Polyurethane resin produced by prepolymer process has a preferably excellent physical properties.

Note that an isocyanate-terminated prepolymer (A) and (B) with a molecular weight of the order in the range of from 800 to 5000 is preferable because of excellency in workability and physical properties.

The polyurethane foam is produced by mixing a first component containing the isocyanate-terminated prepolymers (A) and (B) with a second component containing MOCA and curing the mixture.

The polyurethane foam may be produced by a method in which hollow beads are added, a mechanical foaming method, a chemical foaming method, or the like. While any of the methods may be used in combination, a mechanical foaming method with the aid of a nonionic silicone surfactant made of a copolymer of polyalkylsiloxane and polyether is particularly preferred. Preferred examples of such a nonionic silicone surfactant include SH-192 and L-5340 (manufactured by Dow Corning Toray Silicone Co., Ltd), and B8465 (manufactured by Goldschmidt).

Various additives may be mixed; such as a stabilizer including an antioxidant, a lubricant, a pigment, a filler, an antistatic agent and others.

Description will be given of an example of a method of producing a polyurethane foam of a fine cell type constituting a polishing pad (a polishing layer) below. A method of manufacturing such a polyurethane foam has the following steps:

1) Foaming Step of Preparing Cell Dispersion Liquid

The step includes adding a nonionic silicone surfactant to the first component containing the isocyanate-terminated prepolymers (A) and (B) so that the polyurethane foam will contain 0.05 to 10% by weight of the nonionic silicone surfactant and stirring the mixture in the presence of a non-reactive gas to form a cell dispersion liquid in which the non-reactive gas is dispersed in the form of fine cells. In a case where the prepolymer is solid at an ordinary temperature, the prepolymer is preheated to a proper temperature and used in a molten state.

2) Curing Agent (Chain Extender) Mixing Step

The second component containing MOCA is added into the cell dispersion liquid, which is agitated to thereby obtain a foaming reaction liquid.

3) Casting Step

The forming reaction liquid is cast into a mold.

4) Curing Step

The foaming reaction liquid having been cast into the mold is heated and reaction-cured.

The non-reactive gas used for forming fine cells is preferably not combustible, and is specifically nitrogen, oxygen, a carbon dioxide gas, a rare gas such as helium and argon, and a mixed gas thereof, and the air dried to remove water is most preferable in respect of cost.

As a stirrer for dispersing the nonionic silicone surfactant-containing first component to form fine cells with the non-reactive gas, known stirrers can be used without particular limitation, and examples thereof include a homogenizer, a dissolver, a twin-screw planetary mixer etc. The shape of a stirring blade of the stirrer is not particularly limited either, but a whipper-type stirring blade is preferably used to form fine cells.

In a preferable mode, different stirrers are used in stirring for forming a cell dispersion liquid in the stirring step and in stirring for mixing an added chain extender in the mixing step, respectively. In particular, stirring in the mixing step may not be stirring for forming cells, and a stirrer not generating large cells is preferably used. Such a stirrer is preferably a planetary mixer. The same stirrer may be used in the stirring step and the mixing step, and stirring conditions such as revolution rate of the stirring blade are preferably regulated as necessary.

In the method of producing the polyurethane foam with fine cells, heating and post-curing of the foam obtained after casting and reacting the forming reaction liquid in a mold until the dispersion lost fluidity are effective in improving the physical properties of the foam, and are extremely preferable. The forming reaction liquid may be cast in a mold and immediately post-cured in a heating oven, and even under such conditions, heat is not immediately conducted to the reactive components, and thus the diameters of cells are not increased. The curing reaction is conducted preferably at normal pressures to stabilize the shape of cells.

In the production of the polyurethane foam, a known catalyst promoting polyurethane reaction, such as tertiary amine-based catalysts, may be used. The type and amount of the catalyst added are determined in consideration of flow time in casting in a predetermined mold after the mixing step.

Production of the polyurethane foam may be in a batch system where each component is weighed out, introduced into a vessel and mixed or in a continuous production system where each component and a non-reactive gas are continuously supplied to, and stirred in, a stirring apparatus and the resulting forming reaction liquid is transferred to produce molded articles.

A manufacturing method of a polishing pad may be performed in ways: in one of which a prepolymer which is a raw material from which a polishing pad (a polishing layer) is made is put into a reaction vessel, thereafter a chain extender is mixed into the prepolymer, the mixture is agitated, thereafter the mixture is cast into a mold with a predetermined size to thereby prepare a block and the block is sliced with a slicer like a planer or a band saw; and in another of which in the step of casting into the mold, a thin sheet may be directly produced. Besides, a still another way may be adopted in which a resin of raw material is melted, the melt is extruded through a T die to thereby mold a polyurethane foam directly in the shape of a sheet.

The average cell diameter of the polyurethane foam is preferably from 20 to 80 μm, more preferably from 30 to 60 μm.

A hardness of a polyurethane foam is preferably in the range of from 45 to 65 degrees, more preferably in the range of from 55 to 65 degrees as measured with an Asker D hardness meter.

The specific gravity of the polyurethane foam is preferably from 0.6 to 0.87, more preferably from 0.75 to 0.85.

A polishing pad (polishing layer) of the invention is provided with a depression and a protrusion structure for holding and renewing a slurry. Though in a case where the polishing layer is formed with a fine foam, many openings are on a polishing surface thereof which works so as to hold the slurry, a depression and protrusion structure are preferably provided on the surface of the polishing side thereof in order to achieve more of holdability and renewal of the slurry or in order to prevent induction of dechuck error, breakage of a wafer or decrease in polishing efficiency. The shape of the depression and protrusion structure is not particularly limited insofar as slurry can be retained and renewed, and examples include latticed grooves, concentric circle-shaped grooves, through-holes, non-through-holes, polygonal prism, cylinder, spiral grooves, eccentric grooves, radial grooves, and a combination of these grooves. The groove pitch, groove width, groove thickness etc. are not particularly limited either, and are suitably determined to form grooves. These depression and protrusion structure are generally those having regularity, but the groove pitch, groove width, groove depth etc. can also be changed at each certain region to make retention and renewal of slurry desirable.

The method of forming the depression and protrusion structure is not particularly limited, and for example, formation by mechanical cutting with a jig such as a bite of predetermined size, formation by casting and curing resin in a mold having a specific surface shape, formation by pressing resin with a pressing plate having a specific surface shape, formation by photolithography, formation by a printing means, and formation by a laser light using a $CO_2$ gas laser or the like.

No specific limitation is placed on a thickness of a polishing layer, but a thickness thereof is about 0.8 to 4 mm, preferably 1.5 to 2.5 mm. The method of preparing the polishing layer of this thickness includes a method wherein a block of the fine-cell foam is cut in predetermined thickness by a slicer in a bandsaw system or a planing system, a method that involves casting resin into a mold having a cavity of predetermined thickness and curing the resin, a method of using coating techniques and sheet molding techniques, etc.

The scatter of the thickness of the polishing layer is preferably 100 μm or less. When the scatter of the thickness is higher than 100 μm, large undulation is caused to generate portions different in a contacting state with an object of polishing, thus adversely influencing polishing characteristics. To solve the scatter of the thickness of the polishing layer, the surface of the polishing layer is dressed generally in an initial stage of polishing by a dresser having abrasive grains of diamond deposited or fused thereon, but the polishing layer outside of the range described above requires a longer dressing time to reduce the efficiency of production.

As a method of suppressing the scatter of thickness, there is also a method of buffing the surface of the polishing layer having a predetermined thickness. Buffing is conducted preferably stepwise by using polishing sheets different in grain size.

A polishing pad of the invention may also be a laminate of a polishing layer and a cushion sheet adhered to each other.

The cushion sheet (cushion layer) compensates for characteristics of the polishing layer. The cushion layer is required for satisfying both planarity and uniformity which are in a tradeoff relationship in CMP. Planarity refers to flatness of a pattern region upon polishing an object of polishing having fine unevenness generated upon pattern formation, and uniformity refers to the uniformity of the whole of an object of polishing. Planarity is improved by the characteristics of the polishing layer, while uniformity is improved by the characteristics of the cushion layer. The cushion layer used in the polishing pad of the present invention is preferably softer than the polishing layer.

The material forming the cushion layer is not particularly limited, and examples of such material include a nonwoven fabric such as a polyester nonwoven fabric, a nylon nonwoven fabric or an acrylic nonwoven fabric, a nonwoven fabric impregnated with resin such as a polyester nonwoven fabric impregnated with polyurethane, polymer resin foam such as polyurethane foam and polyethylene foam, rubber resin such as butadiene rubber and isoprene rubber, and photosensitive resin.

Means for adhering the polishing layer to the cushion layer include: for example, a method in which a double sided tape is sandwiched between the polishing layer and the cushion layer, followed by pressing.

The double sided tape is of a common construction in which adhesive layers are provided on both surfaces of a substrate such as a nonwoven fabric or a film. It is preferable to use a film as a substrate with consideration given to prevention of permeation of a slurry into a cushion sheet. A composition of an adhesive layer is, for example, of a rubber-based adhesive, an acrylic-based adhesive or the like. An acrylic-based adhesive is preferable because of less of a content of metal ions, to which consideration is given. Since a polishing layer and a cushion sheet is sometimes different in composition from each other, different compositions are adopted in respective adhesive layers of double sided tape to thereby also enable adhesive forces of the respective adhesive layers to be adjusted to proper values.

A polishing pad of the invention may be provided with a double sided tape on the surface of the pad adhered to a platen. As the double sided tape, a tape of a common construction can be used in which adhesive layers are, as described above, provided on both surfaces of a substrate. As the substrate, for example, a nonwoven fabric or a film is used. Preferably used is a film as a substrate since separation from the platen is necessary after the use of a polishing pad. As a composition of an adhesive layer, for example, a rubber-based adhesive or an acrylic-based adhesive is exemplified. Preferable is an acrylic-based adhesive because of less of metal ions in content to which consideration is given.

A semiconductor device is fabricated after operation in a step of polishing a surface of a semiconductor wafer with a polishing pad. The term, a semiconductor wafer, generally means a silicon wafer on which a wiring metal and an oxide layer are stacked. No specific limitation is imposed on a polishing method of a semiconductor wafer or a polishing apparatus, and polishing is performed with a polishing apparatus equipped, as shown in FIG. 1, with a polishing platen 2 supporting a polishing pad (a polishing layer) 1, a polishing head 5 holding a semiconductor wafer 4, a backing material for applying a uniform pressure against the wafer and a supply mechanism of a polishing agent 3. The polishing pad 1 is mounted on the polishing platen 2 by adhering the pad to the platen with a double sided tape. The polishing platen 2 and the polishing head 5 are disposed so that the polishing pad 1 and the semiconductor wafer 4 supported or held by them oppositely face each other and provided with respective rotary shafts 6 and 7. A pressure mechanism for pressing the semiconductor wafer 4 to the polishing pad 1 is installed on the polishing head 5 side. During polishing, the semiconductor wafer 4 is polished by being pressed against the polishing pad 1 while the polishing platen 2 and the polishing head 5 are rotated and a slurry is fed. No specific limitation is placed on a flow rate of the slurry, a polishing load, a polishing platen rotation number and a wafer rotation number, which are properly adjusted.

Protrusions on the surface of the semiconductor wafer 4 are thereby removed and polished flatly. Thereafter, a semiconductor device is produced therefrom through dicing, bonding, packaging etc. The semiconductor device is used in an arithmetic processor, a memory etc.

EXAMPLES

Description will be given of the invention with examples, while the invention is not limited to description in the examples.

[Measurement and Evaluation Method]
(Measurement of Number-Average Molecular Weight)

A number-average molecular weight was measured by GPC (a Gel Permeation Chromatography) and a value as measured was converted in terms of standard polystyrene molecular weight, and the apparatus and conditions in operation were as follows:

GPC apparatus was an apparatus manufactured by Shimadzu Corp., with Model Number of LC-10A.

Columns that were used in measurement were ones manufactured by Polymer Laboratories Co., in which three columns were in connection including (PL gel, 5 μm and 500 Å), (PL gel, 5 μm and 100 Å) and (PL gel, 5 μm and 50 Å).

A flow rate was 1.0 ml/min.
A concentration was 1.0 g/l.
An injection quantity was 40 μl.
A column temperature was 40° C.
An eluent was tetrahydrofuran.

(Measurement of Tan δ Peak Temperature)

The resulting isocyanate-terminated prepolymer (a), (b), (c), or (d) and MOCA were mixed in such a manner that the ISO Index was set to 105, and the mixture was cured at 100° C. for 20 hours to form each non-foamed polyurethane. The tan δ peak temperature of the non-foamed polyurethane was measured with a dynamic viscoelastometer (DMA861e manufactured by Mettler Toledo, Inc.) under the following measurement conditions.

Measurement Conditions
Frequency: 1 Hz
Temperature: −60 to 150° C.
Rate of temperature rise: 2.5° C./minute
Control load: 3 N (Measurement of Storage Elastic Modulus and Tan δ of Non-Foamed Polyurethane at 40° C.)

The resulting isocyanate-terminated prepolymers (a) to (d) and MOCA were mixed in the ratios shown in Table 1, and each resulting mixture was cured at 100° C. for 20 hours to form a non-foamed polyurethane. The storage elastic modulus (MPa) and the tan δ of each non-foamed polyurethane were measured at 40° C. with a dynamic viscoelastometer (DMA861e manufactured by Mettler Toledo, Inc.) under the following measurement conditions.

Measurement Conditions
Frequency: 1 Hz
Temperature: −60 to 150° C.
Rate of temperature rise: 2.5° C./minute
Control load: 3 N (Measurement of Average Cell Diameter)

The prepared polyurethane foam was sliced with a cutter into measurement samples each with the thinnest possible thickness of 1 mm or less. A surface of a sample was photographed with a scanning electron microscope (S-3500N, Hitachi Science Systems Co., Ltd.) at a magnification of ×100. An effective circular diameter of each of all cells in an arbitrary area was measured with an image analyzing soft (manufactured by MITANI Corp. with a trade name WIN-ROOF) and an average cell diameter was calculated from the measured values.

(Measurement of Specific Gravity)

Determined according to JIS Z8807-1976. A manufactured polyurethane foam cut out in the form of a strip of 4 cm×8.5 cm (thickness: arbitrary) was used as a sample for measurement of specific gravity and left for 16 hours in an environment of a temperature of 23±2° C. and a humidity of 50%±5%. Measurement was conducted by using a specific gravity hydrometer (manufactured by Sartorius Co., Ltd).

(Measurement of Hardness)

Measurement is conducted according to JIS K6253-1997. A manufactured polyurethane foam cut out in a size of 2 cm×2 cm (thickness: arbitrary) was used as a sample for measurement of hardness and left for 16 hours in an environment of a temperature of 23±2° C. and a humidity of 50%±5%. At the time of measurement, samples were stuck on one another to a thickness of 6 mm or more. A hardness meter (Asker D hardness meter, manufactured by Kobunshi Keiki Co., Ltd.) was used to measure hardness.

(Evaluation of Polishing Characteristics)

Using SPP600S (manufactured by Okamoto Machine Tool Works, Ltd.) as a polishing apparatus, and using a prepared polishing pad, a polishing rate was assessed. A thermally oxidized membrane of 1 μm was made on a silicon wafer of 8 inch, one of the membrane was polished above 0.5 μm, and a polishing rate was calculated from a time thereupon. This operation is repeated, Table 1 shows the polishing rate after continuous polishing for 8 hours. For measuring a thickness of an oxidized membrane, an interference film thickness measuring instrument (manufactured by Otsuka Electronics Co., Ltd.) was used. During polishing, silica slurry (SS12 manufactured by Cabot) was added at a flow rate of 150 ml/min. Polishing loading was 350 g/cm$^2$, the number of revolutions of the polishing platen was 35 rpm, and the number of revolutions of the wafer was 30 rpm.

For assessing planarity, a thermally oxidized membrane was deposited 0.5 μm on a 8 inch silicon wafer, patterning of L/S (line and space)=25 μm/5 μm and L/S=5 μm/25 μm was performed, and an oxidized membrane (TEOS) was further deposited 1 μm to prepare a wafer with a pattern at an initial step of 0.5 μm. This wafer was polished under the aforementioned polishing condition, and an abrasion loss of a bottom part of a 25 μm space was measured at a global step of 2000 Å or smaller, thereby, planarity was assessed. Table 1 shows the abrasion loss after continuous polishing for 8 hours. As a value of an abrasion loss is smaller, planarity can be said to be excellent.

(Measurement of Dressing Rate)

The surface of the resulting polishing pad was uniformly dressed with a diamond dresser (Type M, #100, 20 cm φ circle, manufactured by Asahi Diamond Industrial Co., Ltd.), while it was rotated. In this process, the dresser load, the polishing plate rotation speed, the dresser rotation speed, and the dressing time were set at 450 g/cm$^2$, 30 rpm, 15 rpm, and 100 minutes, respectively. The dressing rate (μm/minute) was calculated from the thicknesses of the polishing pad before and after the dressing. The dressing rate is preferably 4.5 or less.

Production Example 1

To a vessel were added 37.4 parts by weight of toluene diisocyanate (a mixture of toluene 2,4-diisocyanate/toluene 2,6-diisocyanate=80/20), 16.8 parts by weight of 4,4'-dicyclohexylmethane diisocyanate, 41.6 parts by weight of polytetramethylene ether glycol with a number average molecular weight of 650, and 4.2 parts by weight of 1,3-butanediol. The mixture was allowed to react at 100° C. for 3 hours to give an isocyanate-terminated prepolymer (a) (NCO content: 14% by weight). The non-foamed polyurethane made from the prepolymer (a) had a tan δ peak temperature of 133° C.

Production Example 2

To a vessel were added 18.4 parts by weight of toluene diisocyanate (a mixture of toluene 2,4-diisocyanate/toluene 2,6-diisocyanate=80/20), 80.4 parts by weight of polytetramethylene ether glycol with a number average molecular weight of 2,000, and 1.1 parts by weight of 1,4-butanediol. The mixture was allowed to react at 100° C. for 5 hours to give an isocyanate-terminated prepolymer (b) (NCO content: 4.4% by weight). The non-foamed polyurethane made from the prepolymer (b) had a tan δ peak temperature of −38° C.

Production Example 3

To a vessel were added 39 parts by weight of toluene diisocyanate (a mixture of toluene 2,4-diisocyanate/toluene 2,6-diisocyanate=80/20), 56 parts by weight of polytetramethylene ether glycol with a number average molecular weight of 1,000, and 5 parts by weight of 1,4-butanediol. The mixture was allowed to react at 100° C. for 5 hours to give an isocyanate-terminated prepolymer (c) (NCO content: 9.4% by weight). The non-foamed polyurethane made from the prepolymer (c) had a tan δ peak temperature of 76° C.

Production Example 4

To a vessel were added 22.2 parts by weight of toluene diisocyanate (a mixture of toluene 2,4-diisocyanate/toluene 2,6-diisocyanate=80/20), 76.6 parts by weight of polyethylene adipate with a number average molecular weight of 2,000 (N-4040 manufactured by Nippon Polyurethane Industry Co., Ltd.), and 1.1 parts by weight of 1,4-butanediol. The mixture was allowed to react at 100° C. for 5 hours to give an isocyanate-terminated prepolymer (d) (NCO content: 6.4% by weight). The non-foamed polyurethane made from the prepolymer (d) had a tan δ peak temperature of 3.5° C.

Example 1

To a reaction vessel were added 85 parts by weight of the isocyanate-terminated prepolymer (a), 15 parts by weight of the isocyanate-terminated prepolymer (b), and 3 parts by weight of a nonionic silicone surfactant (B8465 manufactured by Goldschmidt), and the temperature was controlled to 80° C. The mixture was then vigorously stirred with a stirring blade at a rotation number of 900 rpm for about 4 minutes in such a manner that bubbles were incorporated into the reaction system. To the mixture was added parts by weight of 4,4'-methylenebis(o-chloroaniline) (Ihara Cuamine MT manufactured by Ihara Chemical Industry Co., Ltd.) which had been previously melted at 120° C. The NCO content was 12.56% by weight. After the stirring was continued for about 1 minute, the reaction solution was poured into a loaf-shaped open mold. When the reaction solution lost its fluidity, it was placed in an oven and subjected to post curing at 110° C. for 6 hours so that a polyurethane foam block was obtained. The polyurethane foam block was sliced using a band saw type slicer (manufactured by Fecken-Kirfel GmbH & Co.) so that a polyurethane foam sheet was obtained. The surface of the sheet was buffed with a buffing machine (manufactured by AMITEC Corporation) so that the sheet would have a specific thickness. As a result, the sheet (1.27 mm in thickness) had adjusted thickness accuracy. The buffed sheet was formed by punching to have a specific diameter (60 cm), and concentric grooves, 0.25 mm in width, 1.50 mm in pitch, and 0.40 mm in depth, were formed in the surface of the sheet using a grooving machine (manufactured by Toho Koki Co., Ltd.) so that a polishing layer was formed. A cushion material (cushion layer) produced by impregnating a commercially available nonwoven fabric with a polyurethane was placed on the back surface of the polishing layer so that a polishing pad was prepared.

Example 2

To a reaction vessel were added 60 parts by weight of the isocyanate-terminated prepolymer (a), 40 parts by weight of the isocyanate-terminated prepolymer (b), and 3 parts by weight of the nonionic silicone surfactant, and the temperature was controlled to 80° C. The mixture was then vigorously stirred with a stirring blade at a rotation number of 900 rpm for about 4 minutes in such a manner that bubbles were incorporated into the reaction system. To the mixture was added 30.7 parts by weight of 4,41-methylenebis(o-chloroaniline) which had been previously melted at 120° C. The NCO content was 10.16% by weight. A polishing pad was then prepared in a manner similar to that described in Example 1.

Example 3

To a reaction vessel were added 70 parts by weight of the isocyanate-terminated prepolymer (a), 30 parts by weight of the isocyanate-terminated prepolymer (b), and 3 parts by weight of the nonionic silicone surfactant, and the temperature was controlled to 80° C. The mixture was then vigorously stirred with a stirring blade at a rotation number of 900 rpm for about 4 minutes in such a manner that bubbles were incorporated into the reaction system. To the mixture was added 33.6 parts by weight of 4,4'-methylenebis(o-chloroaniline) which had been previously melted at 120° C. The NCO content was 11.12% by weight. A polishing pad was then prepared in a manner similar to that described in Example 1.

Example 4

To a reaction vessel were added 85 parts by weight of the isocyanate-terminated prepolymer (a), 15 parts by weight of the isocyanate-terminated prepolymer (d), and 3 parts by weight of the nonionic silicone surfactant, and the temperature was controlled to 80° C. The mixture was then vigorously stirred with a stirring blade at a rotation number of 900 rpm for about 4 minutes in such a manner that bubbles were incorporated into the reaction system. To the mixture was added 38.9 parts by weight of 4,41-methylenebis(o-chloroaniline) which had been previously melted at 120° C. The NCO content was 12.86% by weight. A polishing pad was then prepared in a manner similar to that described in Example 1.

Example 5

To a reaction vessel were added 70 parts by weight of the isocyanate-terminated prepolymer (a), 30 parts by weight of the isocyanate-terminated prepolymer (d), and 3 parts by weight of the nonionic silicone surfactant, and the temperature was controlled to 80° C. The mixture was then vigorously stirred with a stirring blade at a rotation number of 900 rpm for about 4 minutes in such a manner that bubbles were incorporated into the reaction system. To the mixture was added 35.4 parts by weight of 4,41-methylenebis(o-chloroaniline) which had been previously melted at 120° C. The NCO content was 11.72% by weight. A polishing pad was then prepared in a manner similar to that described in Example 1.

Example 6

To a reaction vessel were added 60 parts by weight of the isocyanate-terminated prepolymer (a), 40 parts by weight of the isocyanate-terminated prepolymer (d), and 3 parts by weight of the nonionic silicone surfactant, and the temperature was controlled to 80° C. The mixture was then vigorously stirred with a stirring blade at a rotation number of 900 rpm for about 4 minutes in such a manner that bubbles were incorporated into the reaction system. To the mixture was added 33.1 parts by weight of 4,4'-methylenebis(o-chloroaniline) which had been previously melted at 120° C. The NCO content was 10.96% by weight. A polishing pad was then prepared in a manner similar to that described in Example 1.

Comparative Example 1

To a reaction vessel were added 100 parts by weight of the isocyanate-terminated prepolymer (a) and 3 parts by weight of the nonionic silicone surfactant, and the temperature was controlled to 80° C. The mixture was then vigorously stirred with a stirring blade at a rotation number of 900 rpm for about 4 minutes in such a manner that bubbles were incorporated into the reaction system. To the mixture was added 42.3 parts by weight of 4,4'-methylenebis(o-chloroaniline) which had been previously melted at 120° C. The NCO content was 14% by weight. A polishing pad was then prepared in a manner similar to that described in Example 1.

Comparative Example 2

To a reaction vessel were added 30 parts by weight of the isocyanate-terminated prepolymer (a), 70 parts by weight of the isocyanate-terminated prepolymer (b), and 3 parts by weight of the nonionic silicone surfactant, and the temperature was controlled to 80° C. The mixture was then vigorously stirred with a stirring blade at a rotation number of 900 rpm for about 4 minutes in such a manner that bubbles were incorporated into the reaction system. To the mixture was added 22 parts by weight of 4,4'-methylenebis(o-chloroaniline) which had been previously melted at 120° C. The NCO content was 7.28% by weight. A polishing pad was then prepared in a manner similar to that described in Example 1.

Comparative Example 3

To a reaction vessel were added 30 parts by weight of the isocyanate-terminated prepolymer (a), 70 parts by weight of the isocyanate-terminated prepolymer (c), and 3 parts by weight of the nonionic silicone surfactant, and the temperature was controlled to 80° C. The mixture was then vigorously stirred with a stirring blade at a rotation number of 900 rpm for about 4 minutes in such a manner that bubbles were incorporated into the reaction system. To the mixture was added 32.6 parts by weight of 4,4'-methylenebis(o-chloroaniline) which had been previously melted at 120° C. The NCO content was 10.78% by weight. A polishing pad was then prepared in a manner similar to that described in Example 1.

Comparative Example 4

To a reaction vessel were added 100 parts by weight of the isocyanate-terminated prepolymer (b) and 3 parts by weight of the nonionic silicone surfactant, and the temperature was controlled to 80° C. The mixture was then vigorously stirred with a stirring blade at a rotation number of 900 rpm for about 4 minutes in such a manner that bubbles were incorporated into the reaction system. To the mixture was added 13.3 parts by weight of 4,4'-methylenebis(o-chloroaniline) which had been previously melted at 120° C. The NCO content was 4.4% by weight. A polishing pad was then prepared in a manner similar to that described in Example 1.

Comparative Example 5

To a reaction vessel were added 100 parts by weight of the isocyanate-terminated prepolymer (c) and 3 parts by weight of the nonionic silicone surfactant, and the temperature was controlled to 80° C. The mixture was then vigorously stirred with a stirring blade at a rotation number of 900 rpm for about 4 minutes in such a manner that bubbles were incorporated into the reaction system. To the mixture was added 28.4 parts by weight of 4,4'-methylenebis(o-chloroaniline) which had been previously melted at 120° C. The NCO content was 9.4% by weight. A polishing pad was then prepared in a manner similar to that described in Example 1.

Comparative Example 6

To a reaction vessel were added 40 parts by weight of the isocyanate-terminated prepolymer (b), 60 parts by weight of the isocyanate-terminated prepolymer (c), and 3 parts by weight of the nonionic silicone surfactant, and the temperature was controlled to 80° C. The mixture was then vigorously stirred with a stirring blade at a rotation number of 900 rpm for about 4 minutes in such a manner that bubbles were incorporated into the reaction system. To the mixture was added 22.4 parts by weight of 4,4'-methylenebis(o-chloroaniline) which had been previously melted at 120° C. The NCO content was 7.4% by weight. A polishing pad was then prepared in a manner similar to that described in Example 1.

Comparative Example 7

To a reaction vessel were added 100 parts by weight of the isocyanate-terminated prepolymer (d) and 3 parts by weight of the nonionic silicone surfactant, and the temperature was controlled to 80° C. The mixture was then vigorously stirred with a stirring blade at a rotation number of 900 rpm for about 4 minutes in such a manner that bubbles were incorporated into the reaction system. To the mixture was added 19.3 parts by weight of 4,41-methylenebis(o-chloroaniline) which had been previously melted at 120° C. The NCO content was 6.4% by weight. A polishing pad was then prepared in a manner similar to that described in Example 1.

Polishing tests were performed with the polishing pads obtained in the examples and the comparative examples to evaluate their polishing characteristics. The results are shown in Table 1.

TABLE 1

| | Example 1 | Example 2 | Example 3 | Example 4 | Example 5 | Example 6 | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|---|---|---|---|---|
| Prepolymer (a) | 85 | 60 | 70 | 85 | 70 | 60 | 100 | 30 | 30 | — | — | — | — |
| Prepolymer (b) | 15 | 40 | 30 | — | — | — | — | 70 | — | 100 | — | 40 | — |
| Prepolymer (c) | — | — | — | — | — | — | — | — | 70 | — | 100 | 60 | — |
| Prepolymer (d) | — | — | — | 15 | 30 | 40 | — | — | — | — | — | — | 100 |
| Storage Elastic Modulus (MPa) | 1390 | 950 | 1180 | 1450 | 1250 | 1050 | 1790 | 370 | 890 | 52 | 670 | 420 | 140 |
| Tan δ | 0.11 | 0.13 | 0.12 | 0.12 | 0.13 | 0.14 | 0.03 | 0.15 | 0.05 | 0.02 | 0.09 | 0.15 | 0.09 |
| Average Cell Diameter (μm) | 46 | 45 | 45 | 45 | 45 | 45 | 48 | 45 | 45 | 45 | 45 | 45 | 45 |
| Specific Gravity | 0.83 | 0.84 | 0.81 | 0.81 | 0.81 | 0.83 | 0.82 | 0.81 | 0.82 | 0.82 | 0.81 | 0.82 | 0.80 |
| D Hardness (degree) | 60 | 55 | 57 | 61 | 58 | 57 | 68 | 43 | 54 | 12 | 52 | 44 | 43 |
| Polishing Rate (Å/min) | 2430 | 2520 | 2480 | 2350 | 2380 | 2420 | 2310 | 2170 | 2150 | 2050 | 2250 | 2100 | 2100 |
| Abrasion loss (Å) | 2050 | 2130 | 2080 | 2070 | 2100 | 2150 | 1950 | 3730 | 2200 | 7700 | 3100 | 3450 | 4800 |
| Dressing Rate (μm/min) | 4.2 | 3.8 | 3.9 | 4.1 | 3.8 | 3.5 | 10.3 | 2.9 | 7.6 | 18.3 | 4.5 | 3.3 | 4.3 |

The results in Table 1 show that the polishing pads according to the invention are good in both planarization performance and wear resistance, while the polishing pads of the comparative examples are inferior in either planarization performance or wear resistance.

The invention claimed is:

1. A polishing pad, comprising a polishing layer comprising a polyurethane foam having fine cells, wherein the polyurethane foam is a cured product of a reaction of
an isocyanate-terminated prepolymer (A) that is capable of reacting with 4,4'-methylenebis(o-chloroaniline) to form a non-foamed polyurethane having a tan δ peak temperature of 100° C. or more,
an isocyanate-terminated prepolymer (B) that is capable of reacting with 4,4'-methylenebis(o-chloroaniline) to form a non-foamed polyurethane having a tan δ peak temperature of 40° C. or less, and
4,4'-methylenebis(o-chloroaniline), and
the isocyanate-terminated prepolymers (A) and (B) are mixed in an (A)/(B) ratio of 50/50 to 90/10 (by wt %), and
wherein the isocyanate-terminated prepolymer (A) comprises isocyanate component units derived from an aromatic diisocyanate and an alicyclic diisocyanate as raw materials, and the isocyanate-terminated prepolymer (B) comprises an isocyanate component unit derived from an aromatic diisocyanate as a raw material.

2. The polishing pad of claim 1, wherein the isocyanate-terminated prepolymer (A) comprises a unit derived from a high molecular weight polyol with a number average molecular weight of 500 to 800 as a raw material component, and the isocyanate-terminated prepolymer (B) comprises a unit derived from a high molecular weight polyol with a number average molecular weight of 1,500 to 3,000 as a raw material component.

3. The polishing pad of claim 1, wherein the isocyanate-terminated prepolymer (A) has an NCO content of 9.8 to 15% by weight, and the isocyanate-terminated prepolymer (B) has an NCO content of 1.5 to 7% by weight.

4. A method for manufacturing a polishing pad, comprising a step of mixing a first component with a second component and curing the mixture to form a polyurethane foam, the first component comprising isocyanate-terminated prepolymers, the second component comprising a chain extender,
the step comprising adding a nonionic silicone surfactant to the first component comprising the isocyanate-terminated prepolymers so that the polyurethane foam contains 0.05 to 10% by weight of the nonionic silicone surfactant, stirring the first component together with a non-reactive gas to form a cell dispersion liquid in which the non-reactive gas is dispersed in the form of fine cells, then mixing the second component comprising the chain extender into the cell dispersion liquid, and curing the mixture to form the polyurethane foam,
the isocyanate-terminated prepolymers comprising: an isocyanate-terminated prepolymer (A) that is capable of reacting with the chain extender to form a polyurethane having a tan δ peak temperature of 100° C. or more; and an isocyanate-terminated prepolymer (B) that is capable of reacting with the chain extender to form a polyurethane having a tan δ peak temperature of 40° C. or less,
the isocyanate-terminated prepolymers (A) and (B) being mixed in an (A)/(B) ratio of 50/50 to 90/10 (by wt %),
wherein the isocyanate-terminated prepolymer (A) comprises isocyanate component units derived from an aromatic diisocyanate and an alicyclic diisocyanate as raw materials, and the isocyanate-terminated prepolymer B) comprises an isocyanate component unit derived from an aromatic diisocyanate as a raw material.

5. A method for manufacturing a semiconductor device, comprising the step of polishing a surface of a semiconductor wafer with the polishing pad of claim 1.

* * * * *